US007152787B2

(12) United States Patent
Cheng

(10) Patent No.: US 7,152,787 B2
(45) Date of Patent: Dec. 26, 2006

(54) HANDHELD SYSTEM AND METHOD FOR AGE VERIFICATION

(75) Inventor: Russel C. H. Cheng, Tokyo (JP)

(73) Assignee: Beacon Communications KK, Tokyo (JP)

( * ) Notice: Subject to any disclaimer, the term of this patent is extended or adjusted under 35 U.S.C. 154(b) by 0 days.

(21) Appl. No.: 11/161,831

(22) Filed: Aug. 18, 2005

(65) Prior Publication Data

US 2006/0231610 A1 Oct. 19, 2006

Related U.S. Application Data

(60) Provisional application No. 60/672,226, filed on Apr. 15, 2005.

(51) Int. Cl.
*G06K 5/00* (2006.01)

(52) U.S. Cl. ....................... 235/380; 235/375; 235/382

(58) Field of Classification Search ................ 235/375, 235/380, 382, 382.5
See application file for complete search history.

(56) References Cited

U.S. PATENT DOCUMENTS

2003/0150907 A1* 8/2003 Metcalf et al. ............. 235/375
2003/0178487 A1* 9/2003 Rogers ....................... 235/454
2005/0211768 A1* 9/2005 Stillman ..................... 235/381

* cited by examiner

*Primary Examiner*—Karl D. Frech
(74) *Attorney, Agent, or Firm*—Squire, Sanders & Dempsey; Aaron Wininger

(57) ABSTRACT

A handheld computer enables an operator to authenticate an ID, determine if an ID holder is above a minimum age, and enables the collection of data about the ID holder if the ID holder is determined to be above the minimum age. The computer also displays an optional video after the age verification process is completed.

21 Claims, 4 Drawing Sheets

HANDHELD SYSTEM AND METHOD FOR AGE VERIFICATION

PRIORITY REFERENCE TO PRIOR APPLICATIONS

This application claims benefit of and incorporates by reference patent application Ser. No. 60/672,226, entitled "Age Verification Device," filed on Apr. 15, 2005, by inventor Russel C. H. Cheng.

TECHNICAL FIELD

This invention relates generally to age verification, and more particulary, but not exclusively, provides a system and method of authenticating an identification (ID) card and verifying the age of the ID card holder.

BACKGROUND

The sale of certain products can be restricted based on age. For example, the sale or distribution (hereinafter, referred to collectively as distribution) of tobacco and alcohol are restricted to people aged at least 18 and 21, respectively, in most U.S. jurisdictions. Accordingly, in order to avoid violation of the law, it is necessary for a seller or distributor (hereinafter, referred to collectively as a distributor) of age-restricted products to verify the age of a person trying to obtain the product. Age verification entails requesting an identification of the person (e.g., a government-issued identification (ID) card), visually determining the authenticity of ID card, and determining if the age of the person is greater than the age restriction.

However, authenticating an ID card can be complicated because it requires familiarity with various forms of ID cards from multiple jurisdictions and forged ID cards are becoming more and more realistic with the increasing popularity of image manipulation software and high quality color printers.

Further, the age of a person is usually not listed on an ID card, therefore requiring the distributor to determine a person's age based on a birth date listed on the ID card. This can be time consuming and requires knowledge of age restrictions for different products, e.g., 18 for tobacco and 21 for alcohol in some jurisdictions. Further, it may be hard to read the birth date on the ID card in low light environments, especially if printed in small type.

Accordingly, a new system and method are needed that enable easy ID authentication and age verification.

SUMMARY

Embodiments of the invention provide a handheld computer and method of use thereof that enables an operator to authenticate an ID, determine if an ID holder is above a minimum age, and enables the collection of data about the ID holder if the ID holder is determined to be above the minimum age. The computer also displays an optional video after the collection of data is completed.

In an embodiment, the computer includes a scanner; an OCR engine; an age engine; and a display. The scanner scans an ID into an image. The OCR engine translates text from the image into computer editable text including a birth date of an ID holder. The age engine, which is communicatively coupled to the OCR engine, determines if the ID holder is above a minimum age for usage of an age-restricted product based on the birth date and the current date. The display, which is communicatively coupled to the age engine, displays an optional video related to the product if it is determined that the ID holder is above the minimum age.

In an embodiment of the invention, the method comprises: authenticating the ID, scanning an ID into an image; translating text from the image into computer editable text including a birth date of an ID holder; determining if the ID holder is above a minimum age for usage of an age-restricted product based on the birth date and the current date; and displaying an optional video related to the product if it is determined that the ID holder is above the minimum age.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
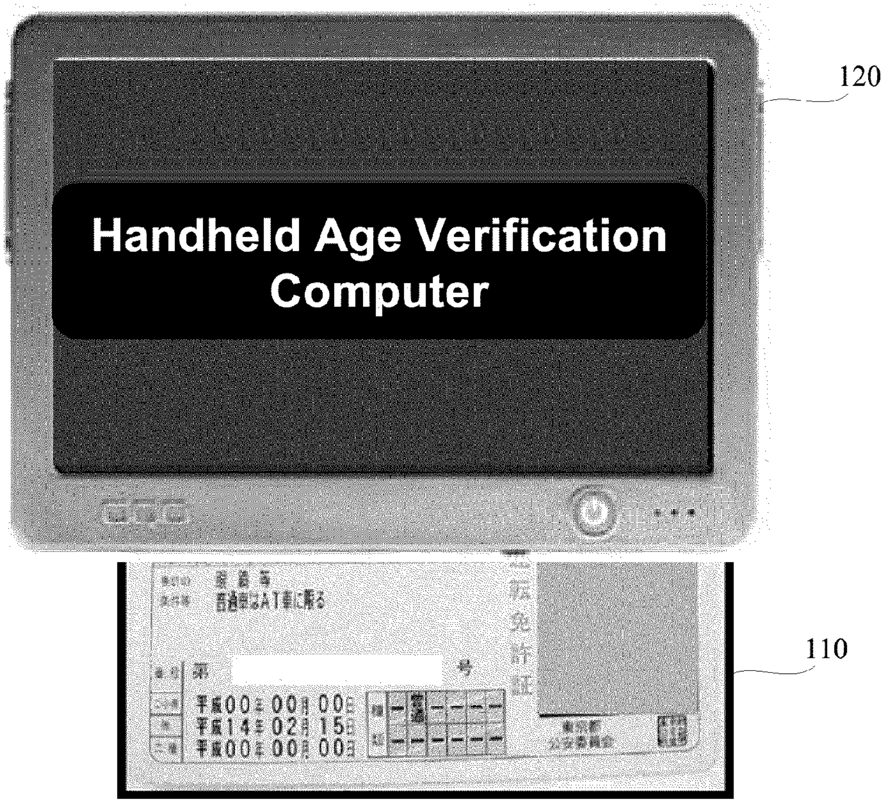
FIG. 1 is a diagram illustrating a handheld age verification device and ID card.

FIG. 1 is a diagram illustrating an ID card 110 and a handheld age verification device 120. Embodiments of the invention provide a portable solution that, within a few seconds, authenticates an ID card or other ID 110 (e.g., a Japanese driver's license or a passport; collectively referred to hereafter as ID), determines the age of person named on the ID 110 and records and verifies the data on the ID 110 to confirm that the holder meets an age requirement (e.g., 20 years of age). In an embodiment of the invention, the device 120 also obtains a biometric feature or features of the holder (e.g., face image, fingerprint, retina scan, etc.) and then uses recognition software to verify the holder matches the biometric data on the ID 110.

In an embodiment of the invention, the device 120 includes a tiny, palm-sized lightweight personal computer (such as the OQO model 01 ultra personal computer) that controls the system, provides the necessary visual display, communications ports and hard disk storage space. A tiny custom-built ID scanner to accurately scan in IDs 110 can be coupled to the device 120 or included with the device 120. The device 120 can also include a cable for coupling the device 120 to a computer for synchronization or downloading of data from the device 120 to the computer.

The entire device can weigh in the range of about 700 grams to about 1.0 kilograms to ensure portability and ease of use by a person who is standing up and moving around a location. The device 120 can be connected to a scanner via a USB cable that provides power to the scanner device in a seamless fashion that makes it appear to be one entire unit. The device 120 may be hung from a cord or strap around a person's neck.

During operation, in one embodiment, the device 120 physically accepts as input an ID 110, authenticates the ID 110, determines the age of the person named on the ID 110 and records and verifies the data on ID to confirm that the holder is older than a pre-specified minimum. The operator slips the ID 110 into a scanner 225 (FIG. 2), such as an ID scanner's card slot. The scanner 225 activates and uses tiny rollers to smoothly bring the ID 110 fully into the card slot. The rollers ensure no damage is done to the ID 110 and positions the ID 110 for an accurate scan.

The device 120 captures a substantially complete image of the ID 110 and saves it to working memory 210 (FIG. 2) in TIFF or other format. The image is then displayed on a display 240 (FIG. 2) to verify legibility of the ID scan. The device 120 keys in on the upper right corner of the ID 110 where the date of birth is written (if a Japanese driver's license). The device 120 then determines if the date of birth correlates with the person's age as being at least a minimum age on that particular day when the ID 110 is handed to the operator to begin the age verification process.

If the ID holder does not meet the minimum age requirement, the device 120 does not record any data and displays an error message. If the ID holder meets the age requirement, the operator of the device 120 will look at the person standing in front of him or her to make sure the person is the same as the one on the ID 110 via a photo visual check. The entire authentication and scanning of the ID takes a total of approximately four seconds from insertion of the ID to the legibility check on the display. The ID 110 is then returned to the ID holder. In an alternative embodiment, the device 120 can obtain biometric data from the ID holder and compare it to biometric printed on or stored on the ID 110 (e.g., use facial recognition software to compare an image of the ID holder with a photo on the ID 110).

The device 120 also makes a determination of the authenticity of the driver license, using, for example, an algorithm of Matsumura Technologies of Japan, similar to the technology used for counterfeit currency detection. One such example algorithm is used by the EXC-5700 of Matsumura Technology, which uses light circuit, magnetic, laser, ultraviolet sensors and other detecting techniques to examine 76 points on a bill.

Figure 3:
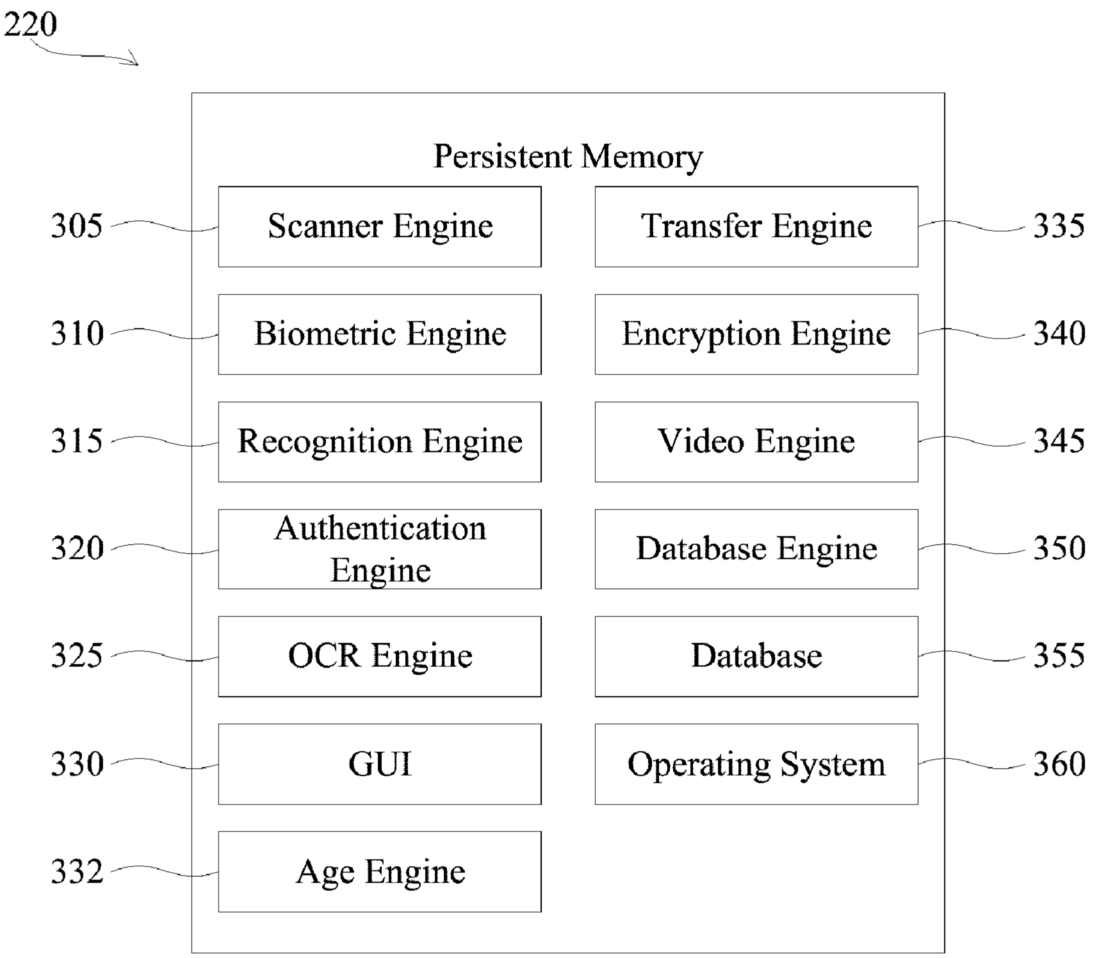
FIG. 3 is a block diagram illustrating a persistent memory of the device.

Upon the operator's confirmation that the ID image is legible on-screen, optical character recognition (OCR) software, e.g., an OCR engine 325 (FIG. 3) then reads and converts the image into text characters and displays that text data on-screen for possible error correction and manual edits by the operator or ID holder. The text data can include birth date, last and first name, address, etc. and can be stored in the database 355 (FIG. 3). Other data can include optional data fields such as sex, occupation, bar codes and marketing questions, and date and time stamp of when data is recorded (age verification process is ended).

Upon operator confirmation of the edits, the device 120 prompts the ID holder or operator for additional required data such as postal code, email address, mobile phone, user ID, user password and a digital signature.

Upon operator confirmation of the additional required data, the device 120 may optionally prompt the ID holder or operator for any additional questions on-screen, such as optional marketing questions. All the required data (including a TIFF image of the ID 110) and optional data can be stored in the database 350 and can be encrypted. Text can be stored in CSV format.

After confirmation of the optional additional questions, a thank you message is displayed on the display 240 with instructions for next actions. Registrants see an approval message that all personal data was saved and that the applicant will receive a verification notice and next steps sent to his mobile phone email address. In the event of a successful verification of age, the device 120 allows the operator to select an optional video function that displays a preset multimedia video to be displayed on the display 240.

In an embodiment, the device 120 includes admin functions for operator only use. The operator can access the admin functions by selecting an Admin function via a graphical user interface (GUI) 330 (FIG. 3). The operator will be prompted for his user ID and password. Upon successful access, the operator can select from the following choices:

1. Show currently captured data
2. Synchronization
3. Quit

Selecting show records will display the currently captured data in the system. Synch launches the synchronization function via a transfer engine 335 (FIG. 3) that allows the operator to download the captured data to a master PC as a CSV file or other format that can be later imported into a database. Quit brings the operator back to a main menu.

Accordingly, the device 120 quickly and accurately verifies a person's age based on the applicant's ID 110. Each transaction may be accomplished in one to two minutes. For example, in an age-restricted product such as tobacco, the device 120 can be used in conjunction with a trained operator that will approach existing smokers who appear to be of smoking age and ask if the smoker would like to instantly sign up to participate in a promotion. If the reply were positive, the operator would request the applicant's ID 110 to start the registration process, as described above.

Operators would be part of an action team that consists of a team manager and a handful of campaign operators who are the customer-facing front line. The team manager is in charge of the campaign operators and the control of the handheld ID age verification units. Upon conclusion of the day's data collection effort, the team manager would collect each unit and synch each unit with a master PC to download the data from the handheld ID unit and reset the data back to zero.

In one embodiment, the device 120 can be used at age-restricted events such as bars, night clubs and other adult-themed event promotions.

Figure 2:
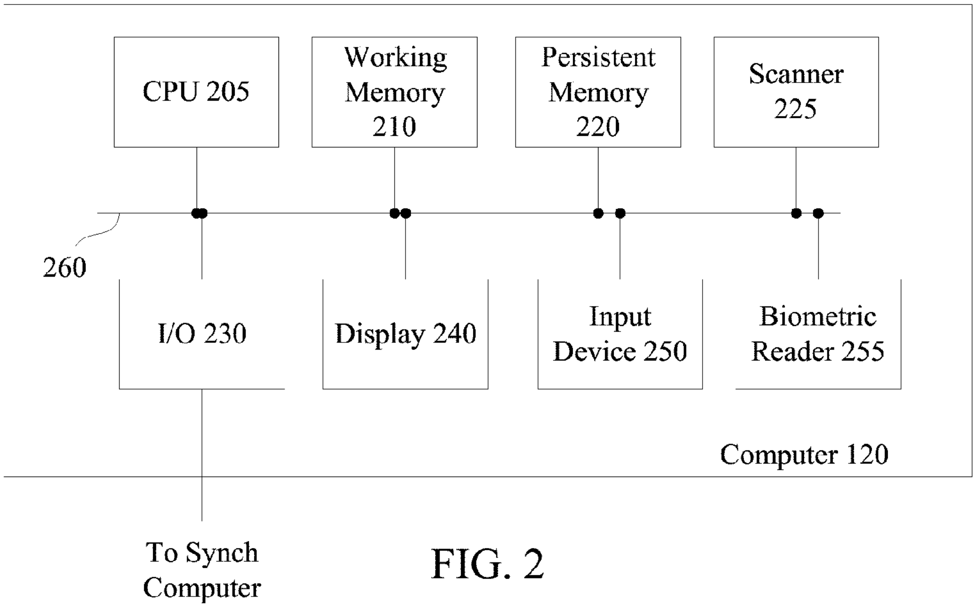
FIG. 2 is a block diagram illustrating the device of FIG. 1.

FIG. 2 is a block diagram illustrating the device 120. The device 120 includes a central processing unit (CPU) 205; working memory 210; persistent memory 220; a scanner 225; input/output (I/O) interface 230; display 240; input device 250; and a biometric reader 255, all communicatively coupled to each other via a bus 260. The CPU 205 may include an Intel Pentium microprocessor, or any other processor capable to execute software stored in the persistent memory 220. The working memory 210 may include random access memory (RAM) or any other type of read/write memory devices or combination of memory devices. The persistent memory 220 may include a hard drive, read only memory (ROM) or any other type of memory device or combination of memory devices that can retain data after the computer 200 is shut off. The scanner 225 is capable of scanning an ID, such as the ID 110. The I/O interface 230 can be communicatively coupled, via wired or wireless techniques, to a computer to download data stored in the persistent memory 220. The display 240 may include a flat panel display, cathode ray tube display, or any other display device. The input device 250, which is optional like other components of the invention, may include a keyboard, mouse, or other device for inputting data, or a combination of devices for inputting data. The biometric reader 255 includes a device capable of reading biometric features of the ID holder, such as CMOS or CCD imaging device capable of imaging a face of the ID holder or body area (e.g., finger print or retina).

One skilled in the art will recognize that the computer 120 may also include additional devices, such as network connections, additional memory, additional processors, LANs, input/output lines for transferring information across a hardware channel, the Internet or an intranet, etc. One skilled in the art will also recognize that the programs and data may be received by and stored in the system in alternative ways.

FIG. 3 is a block diagram illustrating a persistent memory 220 of the device 120. The memory 220 includes a scanner engine 305; a biometric engine 310; a recognition engine 315; an authentication engine 320; an optical character recognition (OCR) engine 325; a graphical user interface (GUI) 330; an age engine 332; a transfer engine 335; an encryption engine 340; a video engine 345; a database engine 350; a database 355; and an operating system (OS) 360.

The scanner engine 305 controls the scanner 225 for scanning the ID 110 into working memory 210 and/or persistent memory 220 (e.g., into the database 355). The scanning can include scanning an image of the ID 110 as well as reading any data stored electronically on the ID 110 (e.g., biometric data stored on the ID 110). The scanner engine 305 can also cause the scanner 225 to scan the ID 110 under different wavelengths of lights (e.g., UV) so that security patterns on the ID 110 become visible.

The biometric engine 310 controls the biometric reader 255, which acquires biometric data from the ID holder, such as a fingerprint, face scan, retina scan, etc. and then stores the biometric data in working memory 210 and/or persistent memory 220 (e.g., the database 355). The recognition engine 315 compares biometric data from the biometric engine 310 with biometric data from the ID 110 to determine if there is a match. For example, the recognition engine 315 can compare a fingerprint scan with fingerprint data from the ID 110. Alternatively, the biometric engine 310 can use facial recognition algorithms to compare a digital image of the ID holder from the biometric engine 310 with an image of the ID holder from the ID 110. In an embodiment, of the invention, the recognition engine 315 uses multiple types of biometric data, such as fingerprints, retina scans, and facial images.

The authentication engine 320 authenticates the ID 110 to confirm it is authentic by looking for the presence and placement of features for that type of ID, as described above. The authentication engine 320 can also check authenticity by looking for security patterns on the ID 110 that is visible under only certain wavelengths of light emitted by the scanner 225 and/or under typical light. The authentication engine 320 can also contact a remote database (e.g., a government database) to confirm the authenticity of the ID 110 (e.g., that the ID holder does in fact have an ID issued by the government authority and that the data on the ID 110 matches the data in the government database). In another embodiment, the authentication engine 320 confirms that the ID 110 matches the expected appearance of an official ID (e.g., correct location of photograph, font text, size and placement, ink color and color densities, etc.). In another embodiment of the invention, the authentication engine 320 examines the thickness, reflective-abilities and/or paper quality of the ID 110 via light refraction or other techniques from the scanner 225. Accordingly, if a sticker with false information was placed over a section of the ID 110, the authentication engine 320 would determine that the thickness, reflectivity and/or paper quality of the ID 110 varies and would therefore reject the ID 110. Alternatively, the authentication engine 320 would determine that the thickness of the ID 110 varies from the correct thickness for that type of ID 110.

The OCR engine 325 translates an image of text on the ID 110 into computer-editable text in ASCII or other format for storage in the database 355 by the database engine 350. In an embodiment of the invention in which the ID 110 includes the printed text stored in electronic format on the ID 110, the OCR engine 325 need not translate the printed text and instead rely on the readout of the text in electronic format. The authentication engine 320 can also authenticate the ID 110 by comparing the OCR text with the electronically recorded text on the ID 110 to confirm they match.

The graphical user interface (GUI) 330 presents an interface to the operator of the device 120 for inputting and editing information, as described above. The GUI 330 also enables an operator to operate other engines, such as the scanner engine 305 to initiate the scanning of the ID 110; the biometric engine 310 to acquire biometric data of a ID holder; the transfer engine 335, which transfers data stored in the database 355 to a computer; and the video engine 345, which plays a video for the ID holder, which can be related to the product being distributed. The GUI 330 also presents optional questions to the ID holder and enables the ID holder to respond to the questions.

The age engine 332 determines if the ID holder meets a minimum age by calculating the age based the day's date and the ID holder's birth date. The ID holder's birth date is determined by the OCR engine 325 reading the birth date on the ID 110 and/or by the scanner engine 305 reading the birth date recorded electronically in the ID 110. If the age exceeds the minimum required age for the product being distributed, then the age engine 332 enables the other engines, such as the database engine 350 to store data and the video engine 345 to show videos.

The encryption engine 340 encrypts some or all data stored in the database 355 and decrypts the data for viewing on the display 240. Further, the encryption engine 340 also decrypts data stored in the database when transferring to a computer with the transfer engine 335. Encrypting the data ensures unauthorized users cannot view the data in case of the loss of the device 120. The database engine 350 stores data in the database 355 and retrieves data from the database 355 for transfer to a computer. Data stored can include: date and time of when the age verification process started; original scanned copy of the ID 110 in TIFF or other format; OCR converted text with edits, including last name, first name, prefecture (state), address field 1, address field 2 and date of birth; additional required data fields such as postal code, mobile phone email address, user ID, user password and digital signature; optional data fields such as sex, occupation, bar codes and marketing questions; and date and time of when data is recorded (age verification process is ended).

The operating system (OS) 360 can include Windows XP or other operating system (e.g., Mac OS).

Figure 4:
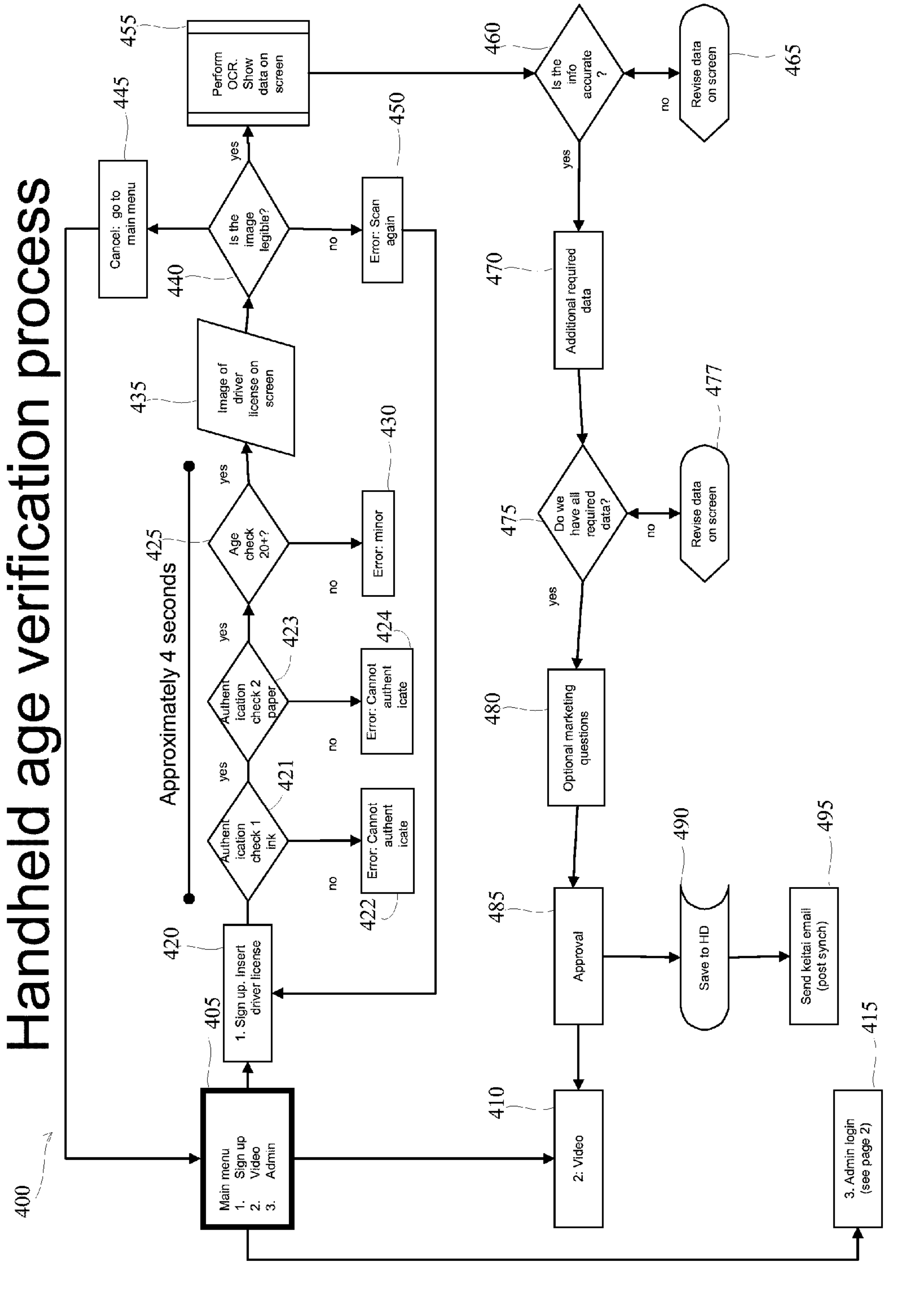
FIG. 4 is a flowchart illustrating a method of age verification.

FIG. 4 is a flowchart illustrating a method 400 of age verification. First, the GUI 330 displays (400) a main menu on the display 240 of the device 120. The main menu includes the options of sign up (420); display (410) video; and admin login (415), which will be discussed in further detail in conjunction with FIG. 5. If sign up (420) is selected, then the ID 110 is inserted into the device 120. The ID (e.g., license) 110 is simultaneously or sequentially authenticated (421 and 423) and scanned by the scanner 225 and the birth date converted to electronic format. The age is then determined by the birth date and current date. If the ID is not authenticated, then the GUI 330 displays (422 and 424) and error and the method ends. No data is stored. If the ID holder is not older (425) than a minimum age (e.g., 20 in Japan), then the GUI 330 displays (430) an error and the method 400 ends. No data is stored. Otherwise, the GUI 330 displays (435) the scanned ID on the on the display 240. If the operator or the device 120 deems the image illegible (440), then the GUI 330 displays (450) an error and the ID 110 is reinserted (420). If the process is canceled (445), then the GUI 330 returns to the main menu (405). Otherwise, the OCR engine 325 performs (455) OCR on the remaining data of the ID 110 and the GUI 330 displays (455) it on the display 240. If the displayed data is inaccurate (460), then the operator or ID holder can revise (465) the data. Once the data is accurate (460), additional data can be entered (470), such as address. If all required data is not entered (475), then data can be revised (477) on screen. Otherwise, the GUI 330 can present (480) optional marketing questions, such as job function, favorite alcohol or cigarette, etc. The operator and/or ID holder then approves (485) the data and the encryption engine 340 encrypts the data and the database engine 350 stores in the encrypted data in the database 355. In addition, the video engine (345) plays a video related to the product being distributed. Further, once the transfer engine 335 transfers data from the database 355 to a computer, the computer can send (495) an email with further information about the product. The method 400 then ends.

Figure 5:
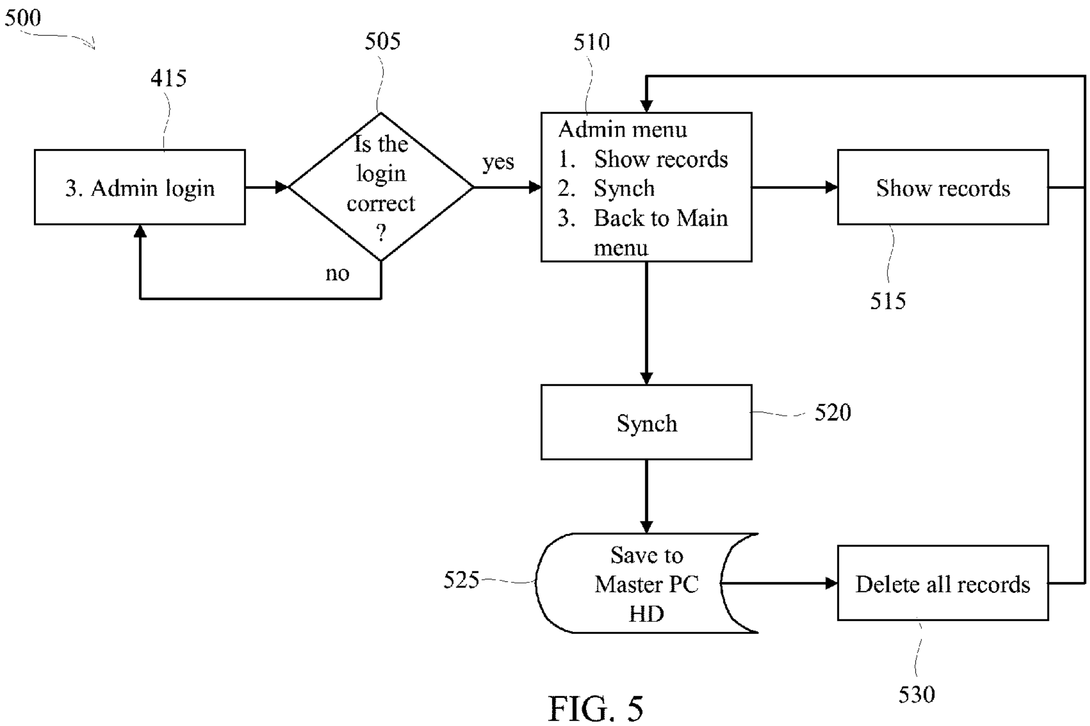
FIG. 5 is a flowchart illustrating a method of administration of the handheld age verification device.

FIG. 5 is a flowchart illustrating a method 500 of administration of the handheld age verification device 120. First, an operator logs (415) in with a user name and/or password. If (505), the login is incorrect, then the operator must repeat the login process (415). If (505) correct, then the GUI 330 displays an admin menu comprising three choices including: show records, synch, and back to main menu. If show records (515) is selected, then the database engine 350 retrieves records from the database 355 and encryption engine 340 decrypts them. The GUI 330 then displays them on the display 240. If synch (520) is selected, then the database engine 350 retrieves all records from the database 355, the encryption engine decrypts the records, and transfer engine 335 transfers the decrypted recorded to another computer, where they are saved (525). The database engine 350 then deletes (530) all records in the database 355. The method 500 then returns to the admin menu 510.

The foregoing description of the illustrated embodiments of the present invention is by way of example only, and other variations and modifications of the above-described embodiments and methods are possible in light of the foregoing teaching. Although the engines are being described as separate and distinct, one skilled in the art will recognize that these engines may be a part of an integral site, may each include portions of multiple engines, or may include combinations of single and multiple engines. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method comprising:

scanning an ID of an ID holder into an image, including a photo of the ID holder on the ID;

directly imaging a face of the ID holder;

comparing the scanned photo with the directly imaged face;

translating text from the image into computer editable text including a birth date of the ID holder;

determining if the ID holder is above a minimum age for usage of an age-restricted product based on the birth date and the current date; and displaying an indication if the ID holder is not above the minimum age or if the directly imaged face does not correspond with the scanned photo.

2. The method of claim 1, wherein the product includes a cigarette.

3. The method of claim 1, further comprising collecting answers to marketing questions from the ID holder and storing the answers from the ID holder.

4. The method of claim 1, further comprising authenticating the ID.

5. The method of claim 4, wherein the authenticating includes checking ink color and ink density.

6. The method of claim 4, wherein the authenticating includes checking the thickness of the ID, reflective-abilities and paper quality.

7. The method of claim 4, wherein the authenticating includes identifying security patterns on the ID.

8. The method of claim 1, further comprising acquiring biometric data of the ID holder and comparing the acquired biometric data with biometric data from the ID to verify the ID holder matches the biometric data from the ID.

9. The method of claim 1, further comprising encrypting the translated text and storing the encrypted translated text into memory.

10. The method of claim 1, further comprising displaying a video related to the product.

11. A system, comprising:

means for scanning an ID of an ID holder into an image, including a photo of the ID holder on the ID;

means for directly imaging a face of the ID holder;

means for comparing the scanned photo with the directly imaged face;

means for translating text from the image into computer editable text including a birth date of the ID holder;

means for determining if the ID holder is above a minimum age for usage of an age-restricted product based on the birth date and the current date; and means for displaying an indication if the ID holder is not above the minimum age or if the directly imaged face does not correspond with the scanned photo.

12. A system, comprising:

a scanner capable of scanning an ID of an ID holder into an image, including a photo of the ID holder on the ID;

a biometric reader capable of directly imaging a face of the ID holder;

a biometric engine, communicative coupled to the reader and the scanner, capable of comparing the scanned photo with the directly imaged face;

an OCR engine capable of translating text from the image into computer editable text including a birth date of the ID holder;

an age engine, communicatively coupled to the OCR engine and the biometric engine, capable of determining if the ID holder is above a minimum age for usage of an age-restricted product based on the birth date and the current date; and a display, communicatively coupled to the age engine, capable of displaying an indication if the ID holder is not above the minimum age or if the directly imaged face does not correspond with the scanned photo.

13. The system of claim 12, wherein the product includes a cigarette.

14. The system of claim 12, further comprising a GUI, communicatively coupled to the age engine, capable of collecting answers to marketing questions from the and storing the answers ID holder.

15. The system of claim 12, further comprising an authentication engine, communicatively coupled to a scanner engine that is communicatively coupled to the scanner, capable of authenticating the ID.

16. The system of claim 15, wherein the authentication engine authenticates by identifying security patterns on the ID.

17. The system of claim 15, wherein the authentication engine authenticates by checking ink color and ink density.

18. The system of claim 15, wherein the authentication engine authenticates by checking the thickness of the ID, reflective-abilities and paper quality.

19. The system of claim 12, wherein the biometric reader is further capable of acquiring biometric data of the ID holder and comparing the acquired biometric data with biometric data from the ID to verify the ID holder matches the biometric data from the ID.

20. The system of claim 12, further comprising an encryption engine, communicatively coupled to the OCR engine, capable of encrypting the translated text and storing the encrypted translated text into memory.

21. The system of claim 12, wherein the display is further capable of displaying a video related to the product.

* * * * *